United States Patent
Watanabe et al.

(10) Patent No.: US 6,373,213 B1
(45) Date of Patent: Apr. 16, 2002

(54) ROTATION CONTROLLING APPARATUS AND ELECTRONIC APPARATUS

(75) Inventors: Hideo Watanabe; Hitoshi Sato; Toshiyuki Murata, all of Kawagoe (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/546,534

(22) Filed: Apr. 10, 2000

(30) Foreign Application Priority Data

Apr. 8, 1999 (JP) .......................................... 11-101646

(51) Int. Cl.[7] .......................... G05B 5/00; H03H 7/08; H02P 1/00; H02P 3/00; H02P 7/00
(52) U.S. Cl. ........................ 318/445; 318/446; 318/626
(58) Field of Search ................................ 318/626, 466, 318/284, 443, 446, 445, 444

(56) References Cited

U.S. PATENT DOCUMENTS

| | | | |
|---|---|---|---|
| 4,164,692 A | * | 8/1979 | Mitterer et al. |
| 4,267,494 A | * | 5/1981 | Matsuoka et al. |
| 4,488,097 A | * | 12/1984 | MacLaughlin |
| 5,270,932 A | | 12/1993 | Yoshizawa et al. ..... 364/424.05 |
| 5,471,124 A | | 11/1995 | Kaaden et al. .............. 318/650 |
| 5,475,787 A | * | 12/1995 | Kato |
| 5,612,602 A | * | 3/1997 | Kubota et al. |
| 5,847,685 A | | 12/1998 | Otsuki .......................... 345/87 |

FOREIGN PATENT DOCUMENTS

| | | | |
|---|---|---|---|
| EP | 0 844 543 A2 | 5/1998 | ......... G05B/19/401 |
| EP | 0 871 101 A1 | 10/1998 | ............ G05D/3/10 |

* cited by examiner

Primary Examiner—Jeffrey Donels
(74) Attorney, Agent, or Firm—Sughrue Mion, PLLC

(57) ABSTRACT

A panel member such as a display panel is rotated with a predetermined shaft as a center of the rotation. The rotation controlling apparatus for controlling the rotation of the panel member is provided with: a signal generating device for generating a position detection signal indicative of an angular position of the panel member around the shaft in response to a rotation of the panel member around the shaft; and a controller for controlling the rotation of the panel member in accordance with the position detection signal generated by the signal generating device, so as to stop the rotation of the panel member by using as a standard a generation timing of the position detection signal, which has a predetermined signal value based on a stop position signal value implying a value of the position detection signal indicative of a stop position at which the rotation of the panel member should be stopped.

12 Claims, 8 Drawing Sheets

ROTATION CONTROLLING APPARATUS AND ELECTRONIC APPARATUS

BACKGROUND OF THE INVENTION

1. Field of the Invention

The present invention relates to a rotation controlling apparatus for controlling a rotation of a panel member, and an electronic apparatus which includes the rotation controlling apparatus and the panel member. More particularly, the present invention relates to a rotation controlling apparatus for controlling a rotation of the panel member, which is accommodated in a front panel (e.g., a dash board) within a compartment of a vehicle and is expanded or developed when it is used, when the panel member is accommodated or expanded, and an electronic apparatus which includes the rotation controlling apparatus and the panel member.

2. Description of the Related Art

Recently, an audio visual apparatus, such as a car audio, a navigation apparatus and so forth are installed in a compartment of an automobile or the like.

There are two methods to install a control panel for controlling the operations of the audio visual apparatus and the navigation apparatus or a display panel for displaying the operational state of those apparatuses in the compartment. That is, in one method, the control panel or the like is directly fixed to the dash board (which implies a portion containing an instrument panel in front of a driver seat, a glove box in front of an assistant seat and a panel portion between the instrument panel and the globe box, and hereafter, which is used in the same meaning) within the compartment. In the other method, when the control panel or the like is not used, it is accommodated in an accommodation room prepared within the dash board, and when it is used, its is pulled out from the accommodation room and is expanded to a usable position. In the latter method, an area or space required to use and accommodate the control panel or the like is narrower than that of the former method. Thus, the latter method is preferably used in such a case that the audio visual apparatus or the like is installed in a small vehicle in which a compartment itself is narrow.

For example, according to the latter method, a display panel as well as a shaft to rotate the display panel is accommodated in an accommodation room when the display panel is not used. In case of using the display panel, the display panel as well as the shaft is pulled and slid from the accommodation room. Then, after the display panel and the shaft are perfectly pulled out, the display panel is rotated with the shaft as a center, so that the display screen of the display panel can be located at a position opposite to a side of a passenger. On the other hand, in case of accommodating the display panel after the usage, the display panel is rotated to a position, at which the display panel can be drawn into the accommodation room (hereinafter, this position is referred to as an "accommodation position"), with the shaft as a center and then, the display panel as well as the shaft is drawn and slid into the accommodation room.

The series of above-mentioned operations is done by driving a slide motor for sliding the display panel and the shaft and by driving a rotation motor for rotating the display panel with the shaft as the center. Here, in case of accommodating the display panel, it is necessary that the display panel is rotated to and stopped at the above mentioned accommodation position. In order to stop the display panel at this accommodation position, a mechanically pushing switch is employed, which is mechanically pushed to be actuated when the display panel is rotated to the accommodation position. In operation, when a part of the thrown down display panel pushes down the mechanically pushing switch, the rotation motor is controlled to be stopped in correspondence with the actuation of the mechanically pushing switch, and then the slide motor is controlled to be driven, so that the display panel is drawn and slid into the accommodation room.

However, the above-mentioned configuration certainly needs the mechanically pushing switch and some switching mechanism to operatively install the mechanically pushing switch. Thus, this results in a problem that the configuration is mechanically complex and its cost cannot be made lower.

Also, if the operation of accommodating and expanding the display panel is frequently repeated, there may be such a case that the mechanically pushing switch does not function well or the switching mechanism is failed or deformed because of an aged deterioration and the like. This results in a problem that it is difficult or impossible to detect that the position of the display panel becomes the accommodation position, and a problem that an erroneous position is recognized as the accommodation position. Moreover, those case lead to a problem that even if the display panel itself is physically stopped at a limit point of a rotatable range, the continuation of the rotation of the rotation motor causes the rotation motor to be broken, and also a problem that, even if at the time of the accommodation operation the display panel strikes or abuts an accommodation opening of the accommodation room and cannot be drawn, the continuation of the driving operation of the slide motor causes the slide motor to be broken.

SUMMARY OF THE INVENTION

The present invention is proposed in view of the above mentioned problems. It is therefore an object of the present invention to provide a rotation controlling apparatus, which can electrically detect a position around a shaft of a panel member (including a stop position at which the panel member should be stopped (e.g., the accommodation position), and hereafter, this position around the shaft of the display panel including the stop position is merely referred to as a "position of the display panel") such as a display panel or the like without using a mechanical configuration such as a mechanically pushing switch or the like, can surely stop the panel member at the stop position, and can surely accommodate the panel member into an accommodation room, and also an electronic apparatus having such a rotation controlling apparatus.

The above object of the present invention can be achieved by a rotation controlling apparatus for controlling a rotation of a panel member such as a display panel, which is rotated with a predetermined shaft as a center of the rotation. The rotation controlling apparatus is provided with: a signal generating device such as an encoder for generating a position detection signal indicative of an angular position of the panel member around the shaft in response to a rotation of the panel member around the shaft; and a controller such as a micro computer for controlling the rotation of the panel member in accordance with the position detection signal generated by the signal generating device, so as to stop the rotation of the panel member by using as a standard a generation timing of the position detection signal, which has a predetermined signal value based on a stop position signal value implying a value of the position detection signal indicative of a stop position at which the rotation of the panel member should be stopped.

According to the rotation controlling apparatus of the present invention, since the angular position of the panel member around the shaft can be electrically detected, it is possible to detect the angular position of the panel member without using a mechanical structure such as a mechanically pushing switch.

Therefore, it is possible to detect the angular position of the panel member around the shaft while preventing (i) the aged deterioration of the mechanical structure associated with the detection of the stop position and (ii) the structure of the apparatus from becoming complicated, and also reducing the cost.

In one aspect of the rotation controlling apparatus of the present invention, the controller uses as the standard the generation timing of the position detection signal corresponding to an added signal value, in which a generation error signal value implying a value of the position detection signal set in advance to compensate a generation error, which may be included in the position detection signal, is added on the stop position signal value.

According to this aspect, since the panel member is stopped while using as the standard the generation timing of the position detection signal corresponding to the added signal value, it is possible to compensate the generation error, which may be included in the position detection signal, and to thereby precisely stop the rotation of the panel member at the stop position.

Therefore, even if an error is generated in the relationship between the output value of the position detection signal and the actual angular position of the panel member around the shaft, it is possible to compensate this error, so that it is possible to precisely stop the rotation of the panel member at the stop position.

In this aspect, the controller may stop the rotation of the panel member, when a rotation time duration, which is set in advance as a time duration from the generation timing of the position detection signal corresponding to the added signal value until the panel member arrives in an allowable error range of the angular position which is set in advance in correspondence with the stop position, has elapsed from the generation timing of the position detection signal corresponding to the added signal value.

According to this aspect, even if any kind of the generation error is generated at the generation timing of the position detection signal, it is possible to stop the panel member within the allowable error range with the stop position as the standard.

In another aspect of the rotation controlling apparatus of the present invention (i) the signal generating device is provided with: an annular resistor which is rotated in conjunction with the rotation of the panel member and to both end terminals of which a voltage corresponding to a predetermined constant voltage value is applied; and a slide contact which contacts with the resistor while rotating, and (ii) the signal generating device outputs, as a value of the position detection signal, a voltage value of a voltage generated between the slide contact and one of the end terminals of the resistor in conjunction with the rotation of the panel member.

According to this aspect, it is possible to generate the position detection signal by means of a relatively simple construction.

In another aspect of the rotation controlling apparatus of the present invention, the stop position is the angular position at which the panel member can be accommodated into an accommodation room portion by a straight movement of the shaft after the panel member stops.

According to this aspect, since the panel member is surely stopped at the stop position after the rotation, it is possible to surely accommodate the panel member into the accommodation room portion after that.

In this aspect that the panel member can be accommodated into the accommodation room portion, when an accommodation of the panel member into the accommodation room portion is completed, the controller may update the stop position signal value to a value of the position detection signal, which is outputted at a timing when the accommodation is completed.

By constructing in this manner, since the stop position signal value is updated by assuming as the stop position the position of the panel member, which could actually allow the completion of the accommodation of the panel member, it is possible to smoothly complete the next operation of accommodating the panel member even if the error is included in the generation of the position detection signal.

In this aspect that the panel member can be accommodated into the accommodation room portion, when an accommodation of the panel member into the accommodation room portion is not possible, the controller may update the stop position signal value to an initial value, which is set in advance as a value of the position detection signal indicative of the stop position at which the panel member can be accommodated into the accommodation room portion.

By constructing in this manner, since the stop position signal value is updated to the initial value when the accommodation of the panel member could not be completed, it is possible to smoothly complete the next operation of accommodating the panel member.

In this aspect that the panel member can be accommodated into the accommodation room portion, the panel member may comprise one of a display panel for displaying information related to a vehicle navigation process to guide a vehicle and an operation panel for performing an operation to control an audio visual apparatus of vehicle installation type, and the stop position may comprise one of the angular position where the information is displayed by the display panel and the angular position where the operation is performed by the operation panel.

By constructing in this manner, as for the display panel, it is possible to surely complete the accommodation of the display panel into the accommodation room portion, and also possible to accurately expand the display panel at the display position when executing the display.

On the other hand, as for the operation panel, it is possible to surely complete the accommodation of the operation panel into the accommodation room portion, and also possible to accurately expand the operation panel at the operation execution position when executing the operation.

The above object of the present invention can be also achieved by an electric apparatus provided with (i) a panel member such as a display panel, which is rotated with a predetermined shaft as a center of the rotation, (ii) an accommodation room portion into which the panel member can be accommodated, (iii) a rotation controlling apparatus for controlling a rotation of the panel member provided with: a signal generating device such as an encoder for generating a position detection signal indicative of an angular position of the panel member around the shaft in response to a rotation of the panel member around the shaft; and a controller such as a micro computer for controlling the rotation of the panel member in accordance with the position detection signal generated by the signal generating device, so as to stop the rotation of the panel member by using as a standard a generation timing of the position detection signal, which has a predetermined signal value based on a stop position signal value implying a value of the position detection signal indicative of a stop position at which the rotation of the panel member should be stopped, the stop position being the angular position at which the panel member can be accommodated into the accommodation room portion by a straight movement of the shaft after the panel member stops, and (iv) an accommodating device such as a slider motor driver for accommodating the panel member and the rotation controlling apparatus in one body into the accommodation room portion, the accommodation room portion being installed in a dash board within a compartment of a vehicle.

According to the electric apparatus of the present invention, it is possible to surely accommodate the panel member into the accommodation room portion in the dash board within the compartment of the vehicle.

In one aspect of the electric apparatus of the present invention, the accommodating device accommodates the panel member and the rotation controlling apparatus in one body into the accommodation room portion, by straightly moving the shaft after the rotation of the panel member is stopped.

According to this aspect, it is possible to accommodate the panel member while preventing the panel member from striking or abutting an opening etc., of the accommodation room portion, in the middle of accommodating the display panel by straightly moving the shaft for rotating the panel member.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Preferred embodiments of the present invention will be explained below with reference to the drawings.

In the following respective embodiments, the present invention is applied to a vehicle installation type navigation apparatus, which assists a service of a vehicle and has a display panel driving device for accommodating a display panel (in which a liquid crystal panel or the like is actually used) serving as a panel member to display various information necessary for the navigation process, into a dash board within a compartment when the display panel is not used, and expanding or developing the display panel to a usable state by pulling out and rotating so as to lift the display panel D when it is used.

Figure 7A:
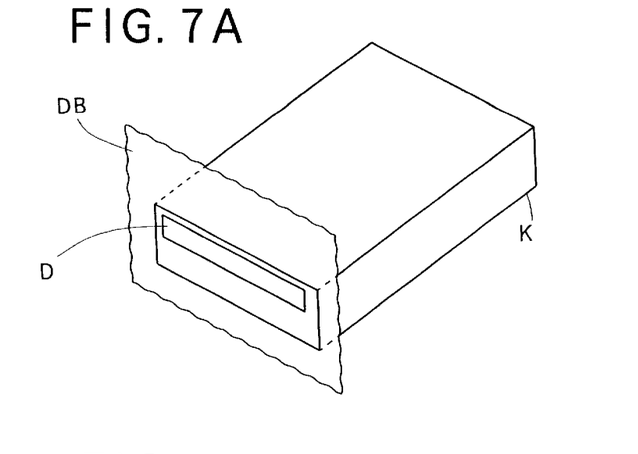
FIG. 7A is a perspective view showing a condition when a display panel, which is driven by a display panel driving device having a mechanically pushing switch to detect the accommodation position, is accommodated.
Figure 7B:
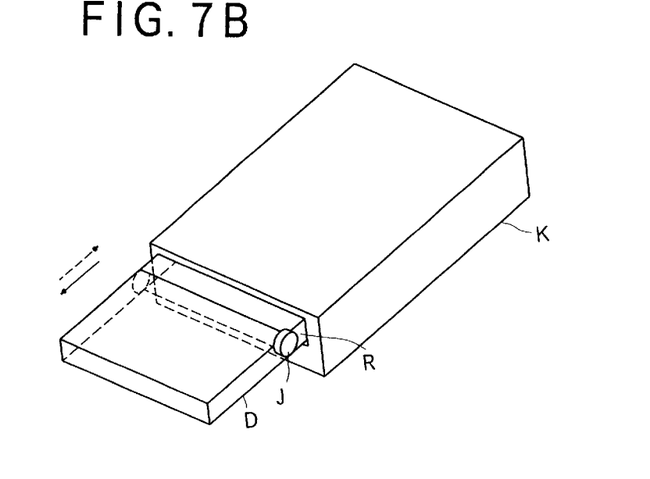
FIG. 7B is a perspective view showing a condition before the display panel of FIG. 7A is drawn or after it is pulled out.
Figure 7C:
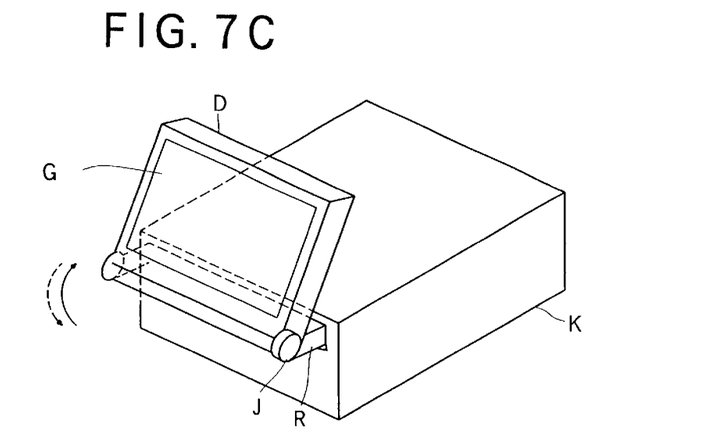
FIG. 7C is a perspective view showing a condition after the display panel of FIG. 7A is expanded or when it begins to be accommodated.
Figure 8:
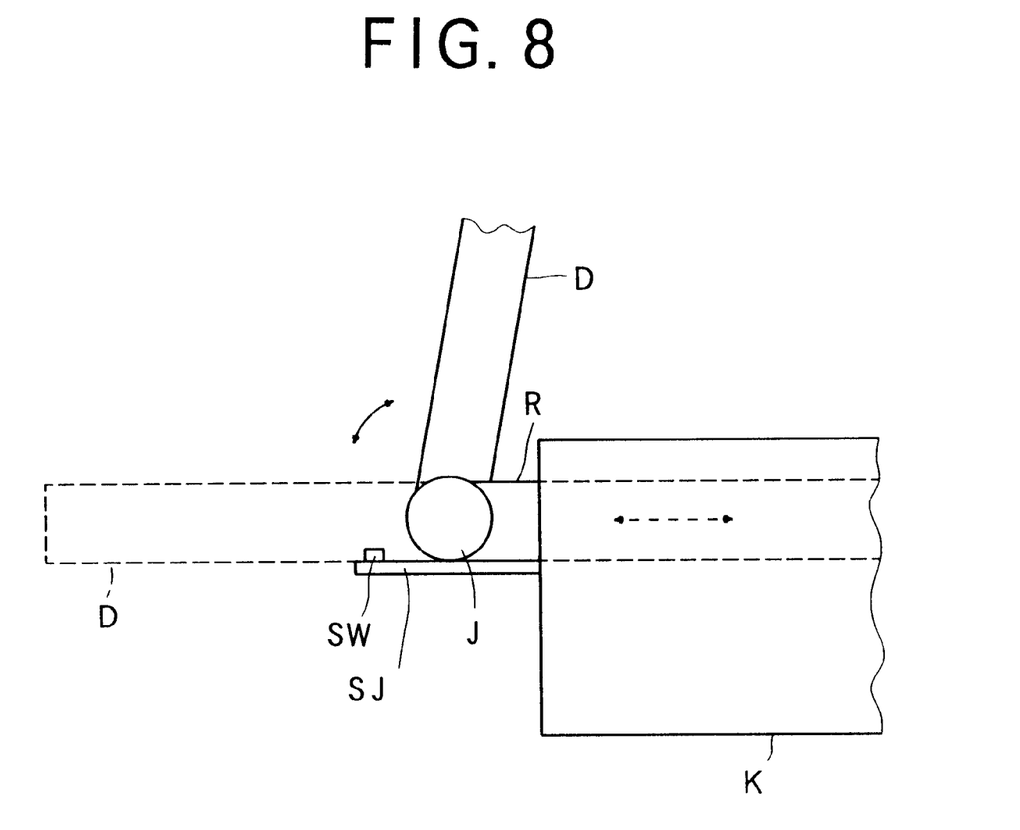
FIG. 8 is a side view showing a schematic configuration of the display panel driving device having the mechanically pushing switch.

Before explaining the actual embodiments according to the present invention, an example of a display panel driven by a display panel driving device having a mechanically pushing switch to stop the display panel at the accommodation position, in such a vehicle installation type navigation apparatus, is firstly explained here with reference to FIGS. 7A, 7B, 7C and 8. FIGS. 7A, 7B and 7C are perspective views showing a manner of expanding and accommodating the display panel by using the mechanically pushing switch. FIG. 8 is an enlarged side view showing the display panel and a part of an accommodation room for accommodating the display panel, as well as the mechanically pushing switch.

As shown in FIGS. 7A, 7B and 7C, a display panel D is accommodated in an accommodation room portion K (refer to FIG. 7A), when the display panel D is not used. At this time, the accommodation room portion K is embedded in a dash board DB in a condition that only a plane containing a part of the display panel D is exposed within the compartment.

Next, when the display panel D is expanded to be used, as shown in FIG. 7B, at first, the display panel D and a shaft J to rotate the display panel D are pulled, so as to be slid on a draw rail R, from the accommodation room portion K into the compartment (refer to a solid line arrow of FIG. 7B).

Then, when the shaft J and the display panel D are perfectly pulled out into the compartment, as shown in FIG. 7C, the display panel D is then rotated with the shaft J as a center, and is thereby lifted up (refer to a solid line arrow of FIG. 7C). This operation causes a display screen G formed on a surface within the display panel D to be located at a position opposite to a side of a passenger, which enables the display panel D to be at a usable state.

On the other hand, in case of accommodating the display panel D after the usage, oppositely to the series of above-mentioned operations, the display panel D is firstly rotated so that it is thrown down up to the accommodation position at which it can be drawn into the accommodation room portion K (refer to a dotted line arrow of FIG. 7C). Next, in the condition that the display panel D is thrown down, it is slid on the draw rail R together with the shaft J, and is accommodated into the accommodation room portion K (refer to a dotted line arrow of FIG. 7B and FIG. 7A).

The series of above-mentioned operations is done by driving a slide motor for sliding the display panel D and the shaft J on the draw rail R and driving a rotation motor for rotating the display panel D with the shaft J as the center.

Here, from the consideration of the operation when the display panel D is accommodated, it is necessary that, when the display panel D is accommodated, the display panel D is thrown down from the position at the usable state (refer to FIG. 7C) to the accommodation position at which it can be accommodated into the accommodation room portion K (refer to FIG. 7B), as mentioned above, and that further the rotational operation is stopped at this accommodable position.

At this time, the above explained mechanism for driving the display panel D is designed as follows. That is, as shown in FIG. 8, a mechanically pushing switch SW is mounted through a switch supporter SJ at a portion corresponding to a position (refer to a dotted line of FIG. 8) of the display panel D when it is accommodated. Then, when a part of the thrown down display panel D pushes down the switch SW, a micro computer (not shown) recognizes that the position of the display panel D becomes the accommodated position. This recognition causes the rotation motor to be stopped and also causes the slide motor to be started driving. Accordingly, the operational flow proceeds to a next accommodation operation (sliding operation).

However, the above-mentioned configuration of mechanically detecting that the position of the display panel D by using the switch SW becomes the accommodation position certainly needs the switch SW and the switch supporter SJ. Thus, this results in a problem that the configuration is mechanically complex and its cost cannot be made lower.

Also, if the operation of accommodating and expanding the display panel D is frequently repeated, there may be such a case that the switch SW does not function or the switch supporter SJ is bent because of aged deterioration and the like. This case results in a problem that it is impossible to detect that the position of the display panel D becomes the accommodation position, and a problem that an erroneous position is recognized as the accommodation position. Moreover, those case lead to a problem that even if the display panel D itself is physically stopped at a limit point of a rotatable range, the continuation of the rotation of the rotation motor causes the rotation motor to be broken, and a problem that, even if at the time of the accommodation operation the display panel D strikes an accommodation opening of the accommodation room portion K and cannot be drawn, the continuation of the driving operation of the slide motor causes the slide motor to be broken.

In view of the above described problems in the example shown in FIG. 7A to FIG. 8 investigated by the inventors of the present inventors, the embodiments of the present invention are constructed as follows so as to solve those problems.

(I) First Embodiment

At first, a first embodiment according to the present invention is described with reference to FIGS. 1 to 5.

At first, the configuration of a display panel driving device according to the first embodiment included in the vehicle installation type navigation apparatus is described with reference to FIG. 1A to 2B.

Figure 1A:
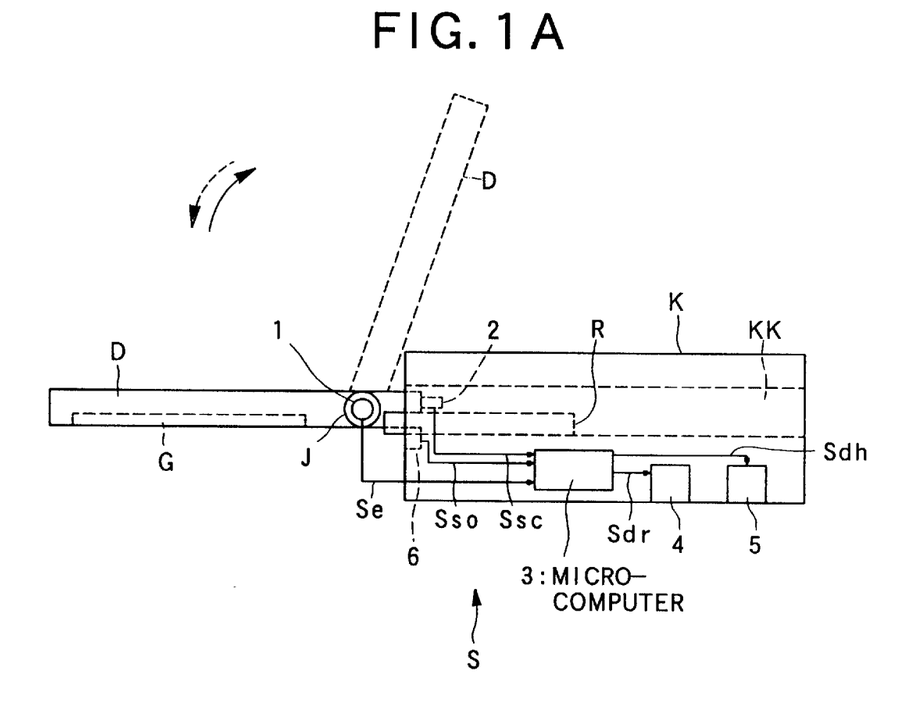
FIG. 1A is a side view showing a configuration of a display panel driving device according to a first embodiment of the present invention.
Figure 1B:
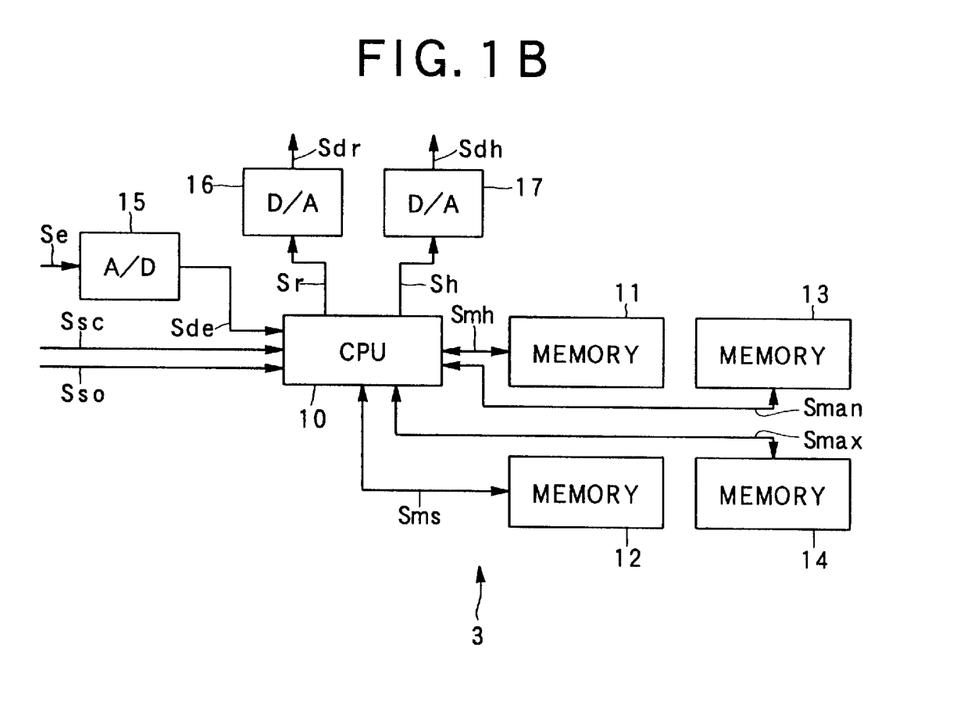
FIG. 1B is a block diagram showing a schematic configuration of a micro computer included in the display panel driving device of the first embodiment.
Figure 2A:
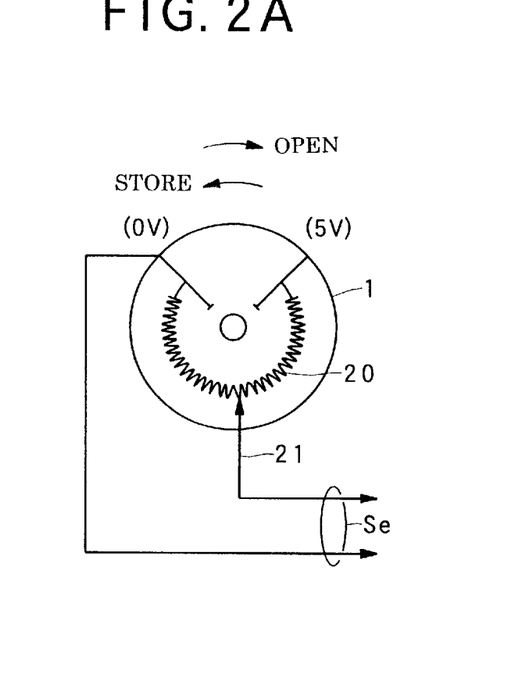
FIG. 2A is a plan view showing a configuration of an encoder of the first embodiment.
Figure 2B:
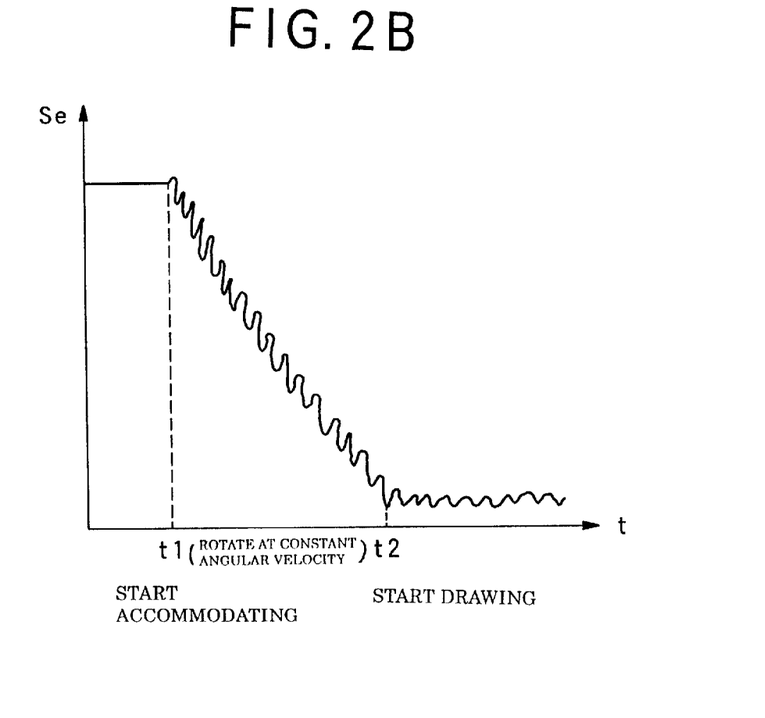
FIG. 2B is a graph showing a property of the encoder of the first embodiment.

FIG. 1A is a side view showing the configuration of the display panel driving device according to the first embodiment. FIG. 1B is a block diagram showing the schematic configuration of a later-described micro computer included in the display panel driving device. FIG. 2A is a plan view showing the configuration of a later-described encoder. FIG. 2B is a graph showing the property of the encoder.

As shown in FIG. 1A, a display panel driving device S according to the first embodiment is roughly constituted by a liquid crystal panel or the like. Actually, it is provided with a display panel D having a display screen G for displaying information necessary for a navigation process on a surface thereof, and an accommodation room portion K having an accommodation space KK for accommodating the display panel D horizontally in FIG. 1A when it is not used. At this time, the accommodation room portion K is embedded in the dash board DB as shown in FIG. 7A.

Also, the display panel D is mounted rotatably with a shaft J as a center. When it is not used, it is drawn together with the shaft J into the accommodation space KK. When, it is used, it is pulled out together with the shaft J to a left direction of FIG. 1A, and is then rotated in a clockwise direction, and is stopped at a position indicated by a dotted line of FIG. 1A, so that it becomes at a usable state.

On the other hand, after the display panel D is used, it is rotated in a counterclockwise direction from the position indicated by the dotted line of FIG. 1A to the accommodation position, at which the display panel D is accommodated into the accommodation space KK (this position is a position indicated by a solid line in FIG. 1A, and this position of the display panel D allows the display panel D to be perfectly accommodated into the accommodation space KK (without striking an inner wall within the accommodation space KK in the middle of the accommodation operation)). After the rotation is stopped at this accommodation position, the display panel D is drawn together with the shaft J in a right direction of FIG. 1A, and is accommodated into the accommodation space KK.

At this time, the operation for pulling out and accommodating the display panel D and the shaft J from and into the accommodation space KK is done by the movement of the display panel D and the shaft J on a draw rail R, which is moved in the left and right direction in FIG. 1A together with the display panel D and the shaft J.

On the other hand, an encoder 1 serving as a signal generating device having later-described configuration is coaxially mounted around the shaft J. The encoder 1 generates a position detection signal Se corresponding to a voltage approximately proportional to a rotation angle of the display panel D, and then outputs it to a later-described micro computer 3.

Moreover, a draw switch 2 is mounted on an end of the display panel D. The draw switch 2 is turned on by the contact between the display panel D and the inner wall of the accommodation space KK when the display panel D is perfectly accommodated into the accommodation space KK. The draw switch 2, when it is turned on, generates a draw signal Ssc, and outputs it to the micro computer 3.

Furthermore, a pull out switch 6 is mounted on a bottom surface of the display panel D. The pull out switch 6 is turned on by the contact between the display panel D and an inner side of a body of the accommodation room portion K (an inner side of a lower portion of an opening to accommodate the display panel D) when the display panel D is perfectly pulled out from the accommodation space KK. The pull out switch 6, when it is turned on, generate a pull signal Sso, and outputs it to the micro computer 3.

A rotation motor driver 4 for driving a rotation motor (not shown) to drive the display panel D, and a slider motor driver 5 serving as an accommodating device for driving a slider motor (not shown) to move the display panel D together with the shaft J in the left and right direction of FIG. 1A are mounted in the portion other than the accommodation space KK within the accommodation room portion K. Those respective drivers are respectively controlled by control signals Sdr and Sdh from the micro computer 3 so as to respectively drive the rotation motor and the slider motor.

Then, the micro computer 3 serving as a controller having a later-described configuration carries out a later-described process in accordance with the position detection signal Se from the encoder 1, the draw signal Ssc and the pull signal Sso from the respective switches, and accordingly controls the expansion and the accommodation of the display panel D.

Here, the expansion of the display panel D implies the operation for pulling out the display panel D accommodated in the accommodation room portion K together with the shaft J from the accommodation room portion K, and then rotating the display panel D with the shaft J as a center in the clockwise direction of FIG. 1A, to thereby make the display panel D usable. On the other hand, the accommodation of the display panel D implies the operation for rotating the display panel D at the usable state to the accommodation position in the counterclockwise direction of FIG. 1A, and perfectly accommodating the display panel D into the accommodation room portion K.

The configuration of the micro computer 3 will be described below with reference to FIG. 1B.

As shown in FIG. 1B, the micro computer 3 is provided with a CPU 10, an accommodation standard value memory 11, an accommodation threshold memory 12, an angle setting threshold memory 13, a maximum expandable value memory 14, an A/D converter 15 and D/A converters 16 and 17.

In the above-mentioned configuration, the A/D converter 15 converts the position detection signal Se analogously generated by the encoder 1 into a digital signal, and generates a digital position detection signal Sde, and then outputs it to the CPU 10.

In accordance with the digital position detection signal Sde from the A/D converter 15 and the draw signal Ssc and the pull signal Sso from the respective switches, 2 and 6, the CPU 10 digitally generates a control signal Sr (for the rotation motor drive 4) and a control signal Sh (for the slider motor driver 5) in order to control the later-described accommodation and expansion operations, and then outputs them to the D/A converters 16 and 17, respectively, while memory signals Smh, Sms, Sman and Smax are sent and received between the respective memories 11 to 14.

Then, the D/A converters 16 and 17 respectively convert the control signals Sh, Sr into analog signals, and then generate the control signals Sdr and Sdh, and further output them to the rotation motor driver 4 and the slider motor driver 5 (shown in FIG. 1A), respectively.

At this time, the accommodation standard value memory 11 is the memory for storing therein an accommodation standard value, which is a voltage value of the position detection signal Se corresponding to a position of the display panel D to be located when the display panel D is drawn into the accommodation space KK. The accommodation standard value memory 11 sends and receives the memory signal Smh indicative of the accommodation standard value to and from the CPU 10.

Also, the accommodation threshold memory 12 is the memory for storing therein an accommodation threshold, which is a voltage value of the position detection signal Se corresponding to a position of the display panel D at a timing of starting a clocking operation of a later-described timer, when the display panel D is rotated from the usable position to the counterclockwise direction of FIG. 1A and is stopped at the accommodation position. So, the accommodation threshold memory 12 sends and receives the memory signal Sms indicative of the accommodation threshold to and from the CPU 10.

This accommodation threshold is set in order to surely stop the display panel D at the accommodation position, even if an error is included in a relation between a voltage value of the position detection signal Se and an actual position of the display panel D (refer to FIG. 2B). In the display panel driving device S of the first embodiment, when the position detection signal Se is generated which corresponds to the same voltage value as the value stored in the accommodation threshold memory 12 as the accommodation threshold during the rotation of the display panel D, after its timing, the rotation of the display panel D is stopped after an elapse of a stop period, which is determined in advance and described later, irrespectively of an output value of the position detection signal Se. Then, its stop position is defined as the accommodation position.

At this time, the accommodation threshold and the stop period are determined in advance under the following condition. That is, in response to a range of the position detection signal Se outputted when the display panel D is located in an allowable range of the accommodation position of the display panel D (i.e., a range in which a range of an error that can be included in the position detection signal Se is added to the allowable range of the accommodation standard value), when the rotation for the accommodation of the display panel D continues only for the stop period after the detection of the position detection signal Se corresponding to the accommodation threshold, the position of the display panel D after the continuation is surely located in the allowable range of the accommodation position.

In addition, the allowable range of the accommodation position implies the allowable range in which the accommodation position, at which the display panel D can be accommodated and which is predetermined in correspondence with a difference between a size of the opening of the accommodation room portion K and a thickness of the display panel D, may be positioned. In response to this allowable range, the accommodation standard value also has an allowable range.

On the other hand, the angle setting threshold memory 13 is the memory for storing therein an angle setting threshold, which is a voltage value of a position detection signal Se in anticipation of a potential difference corresponding to a rotation angle (hereafter, referred to as an inertial rotation angle) by which the display panel D is rotated through the inertia, until the actual stop of the rotation of the display panel D, after the micro computer 3 commands the rotation stop, with respect to a voltage value of the position detection signal Se corresponding to a position at which the display panel driving device S automatically stops the rotation, when the display panel D is rotated from the accommodation position to the clockwise direction of FIG. 1A and arrives at the usable position. So, the angle setting threshold memory 13 sends and receives the memory signal Sman indicative of the angle setting threshold to and from the CPU 10.

At this time, after the display panel driving device S automatically stops the rotation, a user may manually set the position of the display panel D so that the position (i.e., the degree of the lift of the display panel D) of the display panel D can be finally set at a position at which the user can easily view.

Moreover, the maximum expandable value memory 14 is the memory for storing therein a maximum expandable value, which is a voltage value of the position detection signal Se in anticipation of a potential difference corresponding to an inertial rotation angle until the actual stop of the rotation of the display panel D, after the micro computer 3 commands the rotation stop at a maximum position, with respect to a voltage value of a position detection signal Se corresponding to a maximum position (a usable position) at which the display panel D can be finally rotated, in case that the display panel D is rotated to a maximum rotatable position independently of the angle setting value (i.e., in case that the display panel driving device S carries out even the setting of the finally usable position), when the display panel D is rotated from the accommodation position in the clockwise direction of FIG. 1A and arrives at the usable position. So, the maximum expandable value memory 14 sends and receives the memory signal Smax indicative of the maximum expandable value to and from the CPU 10.

Next, the configuration of the encoder 1 for outputting the position detection signal Se will be described below with reference to FIGS. 2A and 2B.

As shown in FIG. 2A, the encoder 1 of the first embodiment is provided with an annular resistor 20 rotated together with the display panel D, and a slide contact 21 which is moved on the resistor 20 by the rotation of the resistor 20 while contacting with the resistor 20. In this configuration, a constant low voltage (for example, 0 V) is applied to an end of the resistor 20 in a direction where the slide contact 21 is moved at the time of the accommodation. On the other hand, a constant high voltage (for example, 5 V) is applied to the other end of the resistor in a direction where the slide contact 21 is moved at the time of the expansion. Then, a potential difference between the slide contact 21 and the end of the resistor 20, to which the constant low voltage is applied, is outputted to the micro computer 3 as the voltage value of the position detection signal Se.

Here, the output property of the encoder 1 is described. The encoder 1 has the simple configuration similar to that of a so-called volume resistor as mentioned above. Thus, as shown in FIG. 2B, the voltage value of the position detection signal Se that is the output from the encoder 1 is changed proportionally to a movement angle of the display panel D in view of a long time (the display panel D is rotated at a constant angular velocity, in both the expansion and the accommodation). In view of a short time, the variation is included in the voltage value.

Thus, in the later-described accommodation and expansion processes, it is necessary to carry out a rotation control in anticipation of this error. Moreover, at this time, the above-mentioned respective thresholds (i.e., the accommodation standard value, the accommodation threshold, the angle setting threshold, the maximum expandable value and the stop period) are set in anticipation of this error.

Next, the operation of the display panel driving device of the first embodiment according to the present invention will be described below with reference to FIG. 3 to FIG. 5.

Figure 3:
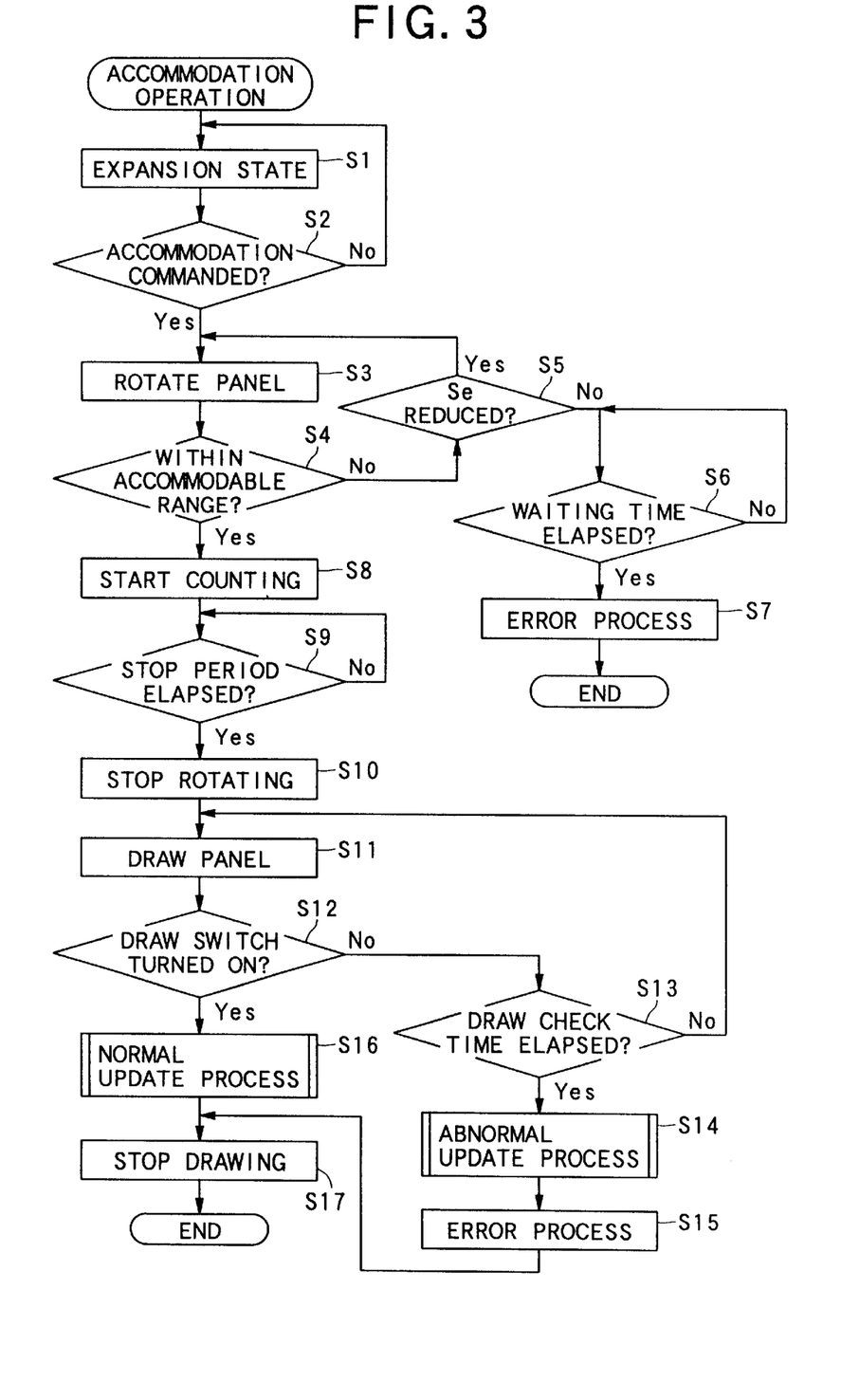
FIG. 3 is a flowchart showing an entire operation in an accommodation operation of the first embodiment.
Figure 4A:
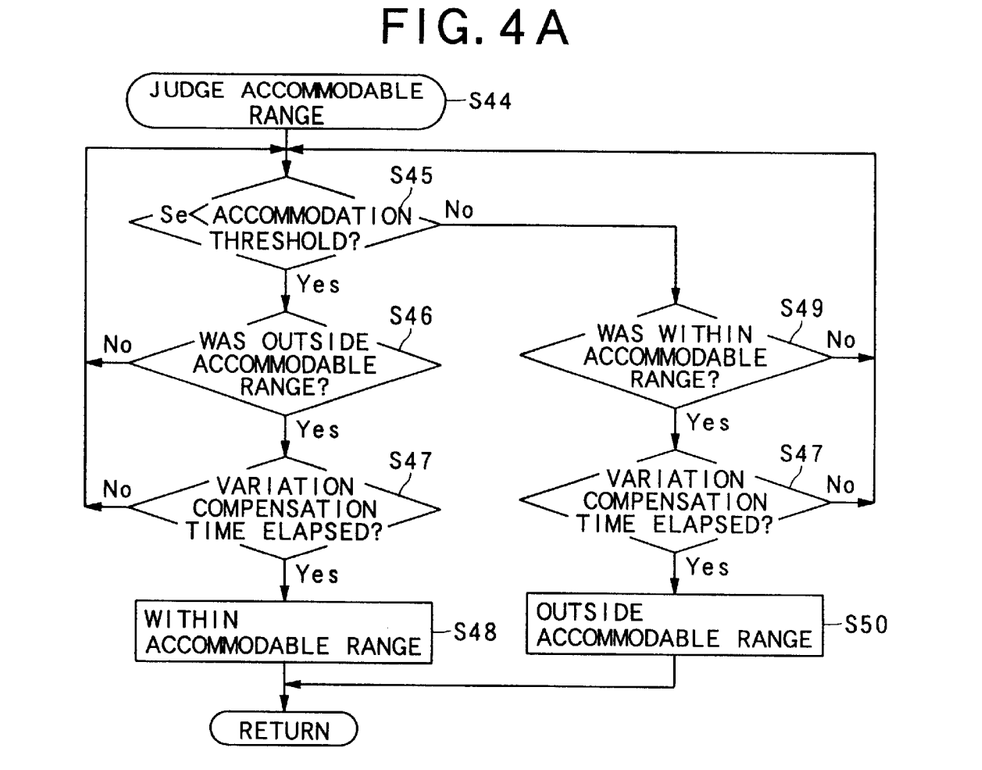
FIG. 4A is a flowchart showing an operation for judging an accommodable range in a detailed operation of the accommodation operation of the first embodiment.

FIG. 3 is a flowchart showing the entire operation of accommodating the display panel D. FIGS. 4A, 4B and 4C are flowcharts showing the detailed operation at the time of the accommodation. FIG. 5 is a flowchart showing the operation of expanding the display panel D. The operations shown by the respective flowcharts are mainly controlled by the CPU 10.

At first, the operation of accommodating the display panel D is described.

In case of accommodating the display panel D from the usable position into the accommodation room portion K, at first, when the display panel D is at the expansion state (in the usable state) (Step S1), it is judged whether or not an operation for accommodating the display panel D is command at an operating section (not shown) (Step S2). If the accommodation command is not issued (Step S2; NO), the expansion state is kept as it is. If the accommodation command is issued (Step S2; YES), the rotation to the accommodation position of the display panel D is started (Step S3).

Then, it is judged whether or not the display panel D under the rotation is rotated to the accommodation position within the accommodable range (namely, the allowable range of the accommodation position) (Step S4). If it is not located within the allowable range (Step S4; NO), it is judged whether or not the voltage value of the position detection signal Se is reduced (namely, whether or not the display panel D having the encoder 1 shown in FIG. 2A and FIG. 2B is surely rotated in a direction toward the accommodation position (actually, in the counterclockwise direction in FIG. 1A)) (Step S5). If the voltage value is reduced (Step S5; YES), it is determined that the display panel D is normally rotated in the direction toward the accommodation position, and the rotation is continued as it is (Step S3). On the other hand, if the voltage value is not reduced (Step S5; NO), it is determined that the display panel D is not rotated in the direction of the reducing the voltage value (namely, not rotated in the direction toward the accommodation position). Then, it is judged whether or not a waiting time (for example, one second) to check a predetermined change of the voltage value has elapsed (Step S6). If it has never elapsed yet (Step S6; NO), the operational flow waits for the elapse. If it has elapsed (Step S6; YES), it is determined that an abnormal trouble is induced in the rotation driving system. So, a predetermined error process is executed (actually, it is again judged whether or not the voltage value of the position detection signal Se is reduced, and if it is not reduced, a display of a drive error is carried out, and if it is reduced, it is determined that the rotation driving system returns back to the normal state, so that the operational flow returns back to the step S3) (Step S7), and the process is ended.

In addition, the detailed process at the step S4 will be described later.

Next, if it is judged at the step S4 that the position of the display panel D is located within the accommodable range (Step S4; YES), an operation for clocking the stop period (actually, for example, about 750 millisecond) is started by a timer (not shown) in the CPU 10. In addition, the rotation of the display panel D in the direction toward the accommodation position is continued even during this period.

Then, it is judged whether or not the stop period has elapsed in the timer (Step S9). If it has never elapsed yet (Step S9; NO), the clocking operation of the timer is continued while the rotation of the display panel D is continued. If it has elapsed (Step S9; YES), the display panel D is judged to be rotated in the direction toward the accommodation position corresponding to the accommodation threshold and the stop period, and the rotation is stopped (Step S10). Next, the operation for drawing the display panel D together with the shaft J into the accommodation room portion K is started (Step S11).

Then, it is judged whether or not the draw switch 2 mounted on the display panel D is turned on, in accordance with the draw signal Ssc (Step S12). If the draw switch 2 is turned on (Step S12; YES), it is determined that the draw of the display panel D is normally and perfectly completed. So, the respective thresholds (i.e., the accommodation standard value, the accommodation threshold, the angle setting threshold and the maximum expandable value) and the like are normally updated (Step S16). The slider motor is stopped (Step S17), and the accommodation operation is ended.

On the other hand, if the draw switch 2 is not turned on in the operation at the step S12 (Step S12; NO), it is judged whether or not a predetermined draw check time (namely, a draw check time set as a necessary time until the normal completion of the draw from the accommodation position, and actually about 6 seconds) has elapsed from the start of the draw of the display panel D (Step S13). If it has never elapsed yet (Step S13; NO), it is determined that the draw is still continued, and the operational flow returns back to the step S11. If the predetermined draw check time has elapsed (Step S13; YES), it is determined that the draw of the display panel D is not normally ended because of any reason, and the respective thresholds (i.e., the accommodation standard value, the accommodation threshold, the angle setting threshold and the maximum expandable value) and the like are updated by using the abnormal state as a premise (Step S14). Moreover, a predetermined error display process for the abnormal draw is carried out (Step S15), and the operational flow proceeds to the step S17.

The detailed portions in the processes at the steps S14 and S16 will be described later.

Next, the detailed portion of the process for judging whether or not the position of the display panel D is located in the allowable range (Step S4) among the above-mentioned respective processes will be described below with reference to FIG. 4A. At this time, the process corresponding to the flowchart shown in FIG. 4A is the process repeated for each predetermined time interval (actually, about 8 millisecond) in both of the accommodation and the expansion of the display panel D.

In the judging process (Step S4), it is firstly judged whether or not the voltage value of the position detection signal Se becomes less than the above-mentioned accommodation threshold (namely, whether or not the display panel D is rotated to the position of the display panel D in which the position detection signal Se corresponding to the voltage value corresponding to the display panel D is generated) (Step S45).

If the voltage value of the position detection signal Se becomes less than the accommodation threshold (Step S45; YES), it is then judged whether or not a value of a position detection signal Se prior to one timing in a sampling timing of the A/D converter 15 is outside the accommodable range (namely, whether or not the voltage value of the position detection signal Se prior to one timing is equal to or greater than the accommodation threshold) (Step S46). If it is outside the accommodable range (Step S46; YES), it is further judged whether or not a variation compensation time in anticipation of the variation in the voltage value of the position detection signal Se shown in FIG. 2B has elapsed (Step S47). Here, the variation compensation time implies a time (actually about 32 millisecond) in which in view of the variation, if the relationship of the magnitude between the accommodation threshold and the voltage value of the position detection signal Se is maintained equal before and after its time elapse, the relationship between a present position of the display panel D and a position of the display panel D corresponding to the accommodation threshold can be judged to be in the positional relation corresponding to the equally-maintained relationship of the magnitude.

Then, if the variation compensation time has elapsed (Step S47; YES), the present position of the display panel D is judged to be within the accommodable range (Step S48). Then, the operational flow proceeds to the step S8.

If the value of the position detection signal Se is not outside the accommodable range prior to the one timing (Step S46; NO), or if the variation compensation time has never elapsed yet although the value of the position detection signal Se is outside the accommodable range (Step S47; NO), it cannot be determined that the present position of the display panel D is still within the accommodable range. Again, the operational flow returns back to the step S45, and the above-mentioned operations are repeated (in addition, at the time of the accommodation, it is rare that NO is judged at the step S46).

On the other hand, if it is judged at the step S45 that the voltage value of the position detection signal Se is not less than the accommodation threshold (Step S45; NO), it is judged whether or not the value of the position detection signal Se prior to the one timing in the sampling timing of the A/D converter 15 is within the accommodable range (namely, whether or not the voltage value of the position detection signal Se prior to the one timing is less than the accommodation threshold) (Step S49). If it is within the accommodable range (Step S49; YES), it is judged whether or not the variation compensation time has elapsed (Step S47).

Then, if the variation compensation time has elapsed (Step S47; YES), the present position of the display panel D is judged to be outside the accommodable range (Step S50). Then, the operational flow proceeds to the step S8.

On the other hand, if the value of the position detection signal Se is not within the accommodable range prior to the one timing (Step S49; NO), or if the variation compensation time has never elapsed yet although the value of the position detection signal Se is outside the accommodable range (Step S47; NO), it cannot be determined that the present position of the display panel D is still outside the accommodable range. Again, the operational flow returns back to the step S45, and the above-mentioned operations are repeated (in addition, at the time of the accommodation, it is rare that YES is judged at the step S49).

Next, the detailed processes of the normal update process of the respective thresholds and the like (Step S16) and the abnormal update of the respective thresholds and the like (Step S14) among the respective processes shown in FIG. 3 will be described below with reference to FIGS. 4B and 4C.

At first, the normal update process is described with reference to FIG. 4B.

In case of the update of the respective thresholds and the like when the display panel D is normally accommodated into the accommodation room portion K (Step S16), at first, by assuming that the accommodation standard value stored in the accommodation standard value memory 11 indicates the normally accommodable position of the display panel D, the stored accommodation standard value A is updated to the value of the position detection signal Se outputted from the encoder 1 at the time of the rotation stop at the Step S10 (Step S20).

Next, the accommodation threshold stored in the accommodation threshold memory 12 is updated to a value in which a predetermined angle compensation value a is added to the updated accommodation standard value A at the Step S20 (Step S21). At this time, the angle compensation value α is the compensation value set by considering the above-mentioned error included in the position detection signal Se in such a way that, when the display panel D is continued to be rotated in the direction toward the accommodation position only for the above-mentioned stop period from the position of the display panel D corresponding to the accommodation threshold to be updated, the rotation stop position after the continuation is surely located within the allowable range of the accommodation position of the display panel D.

Moreover, the angle setting threshold stored in the angle setting threshold memory 13 is updated to a value in which a predetermined addition value β is added to the updated accommodation standard value A at the Step S20 (Step S22). At this time, the addition value β is the addition value in which a potential difference corresponding to an inertial rotation angle is subtracted from a difference between the updated accommodation standard value and the voltage value of the position detection signal Se corresponding to the position at which the display panel driving device S automatically stops the rotation.

Finally, the maximum expandable value stored in the maximum expandable value memory 14 is updated to a value in which a predetermined addition value γ is added to the updated accommodation standard value A at the Step S20 (Step S23). At this time, the addition value γ is the addition value in which the potential difference corresponding to the inertial rotation angle is subtracted from a difference between the updated accommodation standard value and the voltage value of the position detection signal Se corresponding to the maximum position at which the display panel D can be expanded.

When the update of the respective thresholds and the like is ended (Step S23), the operational flow returns back to the original step S17.

Next, the abnormal update process will be described below with reference to FIG. 4C.

In case of the update of the respective thresholds and the like when the display panel D is not normally accommodated into the accommodation room portion K (Step S14), at first, as for the accommodation standard value, by considering that the display panel D cannot be normally stored under a present position detection signal Se, the accommodation standard value A is updated to an initial value predetermined as the accommodation standard value (Step S24). At this time, the initial value is an initial value predetermined on design as the accommodation standard value under which the normal accommodation is possible in any display panel driving device S, with regard to all manufactured display panel driving devices S.

Figure 4B:
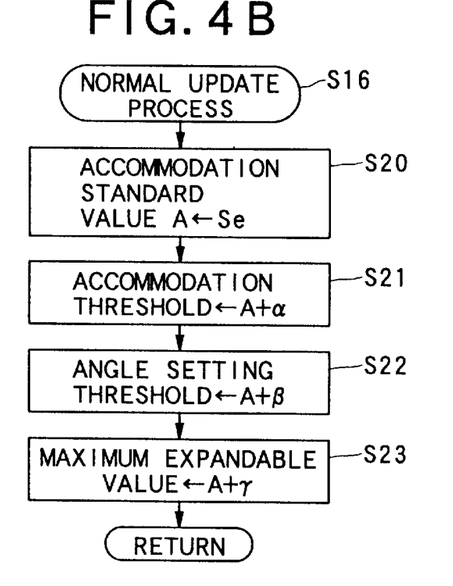
FIG. 4B is a flowchart showing a normal update process in the detailed operation of the accommodation operation of the first embodiment.
Figure 4C:
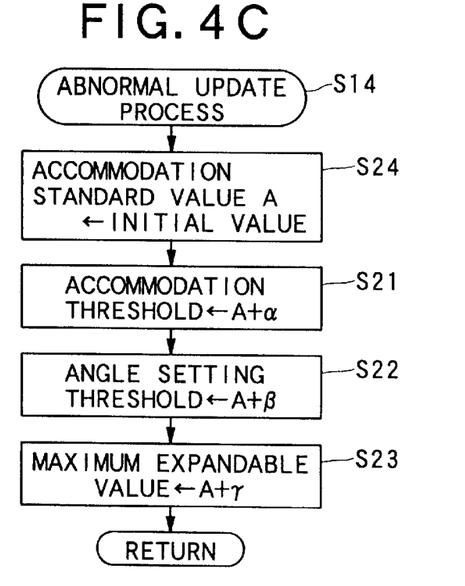
FIG. 4C is a flowchart showing an abnormal update process in the detailed operation of the accommodation operation of the first embodiment.
Figure 5:
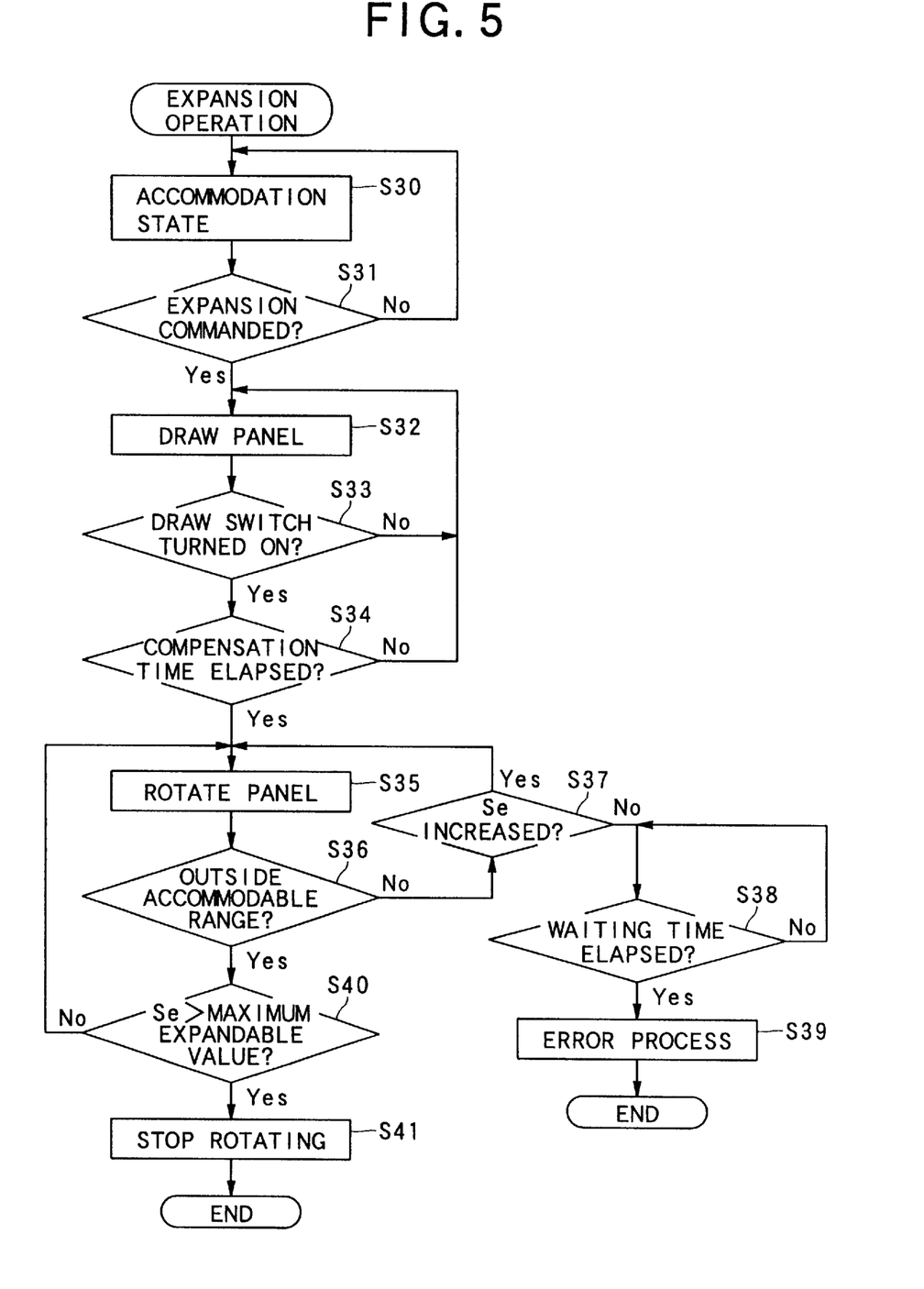
FIG. 5 is a flowchart showing an entire operation in an expansion operation in the first embodiment.

If the update of the accommodation standard value is ended (Step S24), the updated accommodation standard value A is used to perform the update process similar to that shown in FIG. 4B on the respective thresholds and the like (Steps S21 to S23), and the operational flow returns back to the original step S15.

Next, the operation in the expansion of the display panel D will be described below with reference to FIG. 5. In addition, the expansion operation shown in FIG. 5 is the operation in the case of perfectly automatically expanding the display panel D to the usable position without stopping the rotation (lift) of the display panel D by using the angle setting threshold.

In case of expanding the display panel D from the accommodation position to the usable position, at first, when the display panel D is at the accommodation state (Step S30), it is judged whether or not an operation for expanding the display panel D is command at an operating section (not shown) (Step S31). If the expanding command is not issued (Step S31; NO), the accommodation state is maintained as it is. If the expansion command is issued (Step S31; YES), the slider motor is then driven to start drawing the display panel D from the accommodation space KK to the accommodation position (Step S32).

Then, it is judged whether or not the draw switch 6 mounted on the display panel D is turned on, in accordance with the pull signal Sso (Step S33). If the draw switch 6 is turned on (Step S33; YES), it is judged whether or not a compensation time to compensate an operation error of the draw switch 6 has elapsed (Step S34). The compensation time actually implies the time (actually about 32 milliseconds) in which the draw of the display panel D can be judged to be completed, if the pull signal Sso indicative of the on-state before and after its time elapse is outputted, in view of the operation error of the draw switch 6. If the compensation time has elapsed (Step S34; YES), it is determined that the draw of the display panel D and the shaft J is surely completed. Next, the rotation (lift) of the display panel D is started (Step S35).

If the draw switch 6 is not turned on (Step S33; NO), and even if the draw switch 6 is turned on (Step S33; YES), if the compensation time has never elapsed (Step S34; NO), it is determined that the draw of the display panel D is not still completed. The draw is continued in succession (Step S32).

Then, when the rotation of the display panel D is continued, it is judged whether or not the display panel D under the rotation is rotated to the outside of the accommodable range (Step S36). If it is not outside the accommodable range (Step S36; NO), it is judged whether or not the voltage value of the position detection signal Se is increased (namely, whether or not the display panel D having the encoder 1 shown in FIGS. 2A and 2B is surely rotated in the direction toward the usable position (actually, whether or not it is rotated in the clockwise direction in FIG. 1A)) (Step S37). If the voltage value is increased (Step S37; YES), it is determined that the display panel D is normally rotated in the direction toward the usable position, and the rotation is continued as it is (Step S35). On the other hand, if the voltage value of the position detection signal Se is not increased (Step S37; NO), it is determined that the display panel D is not rotated in the direction of increasing the voltage value (namely, not rotated in the direction toward the usable position). Then, it is judged whether or not a waiting time (for example, one second) to check a predetermined change of the voltage value has elapsed (Step S38). If it has never elapsed yet (Step S38; NO), the operational flow waits for the elapse. If it has elapsed (Step S38; YES), it is determined that an abnormal trouble is induced in the rotation driving system. So, a predetermined error process is executed (actually, it is again judged whether or not the voltage value of the position detection signal Se is increased, and if it is not increased, the display of the drive error is carried out, and if it is increased, it is determined that the rotation driving system returns back to the normal state, so that the operational flow returns back to the step S35) (Step S39), and the process is ended.

At the step S36, the process for judging the accommodable range is executed similarly to the detailed process at the step S4 shown in FIG. 4A. If the step S50 in FIG. 4A is judged, the operational flow proceeds to the step S40 in FIG. 5. If the step S48 in FIG. 4A is judged, the operational flow proceeds to the step S37 in FIG. 5.

Next, if it is judged at the step S36 that the position of the display panel D is outside the accommodable range (Step S36; YES), it is judged whether or not the voltage value of the position detection signal Se exceeds the maximum expandable value (Step S40).

If it exceeds the maximum expandable value (Step S40; YES), the rotation of the display panel D is stopped (Step S41), and the expansion process is ended. At this time, the maximum expandable value is set in anticipation of the inertial rotation angle of the display panel D. Thus, the display panel D is accurately stopped at the usable position (the maximum expandable position).

On the other hand, if it is judged at the step S40 that the voltage value of the position detection signal Se is not greater than the maximum expandable value (Step S40; NO), the operational flow returns to the step S35, so as to continue the lift of the display panel D in succession.

As mentioned above, according to the operation of the display panel driving device in the first embodiment, the position of the display panel D (around the shaft J) can be electrically detected to thereby detect the position of the display panel D without using the mechanical configuration.

Also, the display panel D is stopped with the timing when the position detection signal Se corresponding to the accommodation threshold as a standard. Thus, the generation error included in the position detection signal Se can be compensated, and the rotation of the display panel D can be accurately stopped at the accommodation position, and further the display panel D can be surely accommodated into the accommodation room portion K in the dash board within the compartment.

Also, it is controlled such that the rotation of the display panel D is stopped when only the stop period has elapsed from the timing of the generation of the position detection signal Se corresponding to the accommodation threshold. Thus, even if any generation error is brought about which may be considered at the time of the generation of the position detection signal Se, the display panel D can be stopped within the allowable error range with the accommodation position as a standard.

Moreover, in conjunction with the rotation of the display panel D, the encoder 1 outputs the value of the voltage generated between the slide contact 21 and the constant low voltage terminal of the resistor 20, as the voltage value of the position detection signal Se. Thus, the position detection signal Se can be generated by the simple configuration.

Furthermore, when the accommodation of the display panel D into the accommodation room portion K is completed, the accommodation standard value is updated to the voltage value of the position detection signal Se at that time. Thus, the accommodation standard value is updated by using as the accommodation position the position of the display panel D at which the accommodation of the display panel D can be actually completed. Hence, even if the error is included in the generation of the position detection signal Se, it is possible to smoothly complete the operation for accommodating the display panel D at a next time.

Also, if the display panel D cannot be accommodated into the accommodation room portion K, the accommodation standard value is updated to the predetermined initial value. Thus, it is possible to smoothly complete the operation for accommodating the display panel D at a next time.

Moreover, it is possible to surely complete the accommodation of the display panel D into the accommodation room portion K, and also possible to accurately expand the display panel D to the usable position when the display is executed.

Furthermore, even if the shaft J to rotate the display panel D is straightly moved to accordingly accommodate the display panel D into the accommodation room portion K, the display panel D can be accommodated without the strike of the display panel D onto the opening and the like of the accommodation room portion K in the middle of the accommodation.

In addition, the expansion operation in the first embodiment may be designed as follows. That is, the expansion of the display panel D is stopped when the position detection signal Se corresponding to the voltage value indicated by the angle setting threshold is detected in the middle of the expansion to the usable position. After that, the display panel D is manually stopped by a user at any position between the above-mentioned stopped position and the usable position.

(II) Second Embodiment

Figure 6:
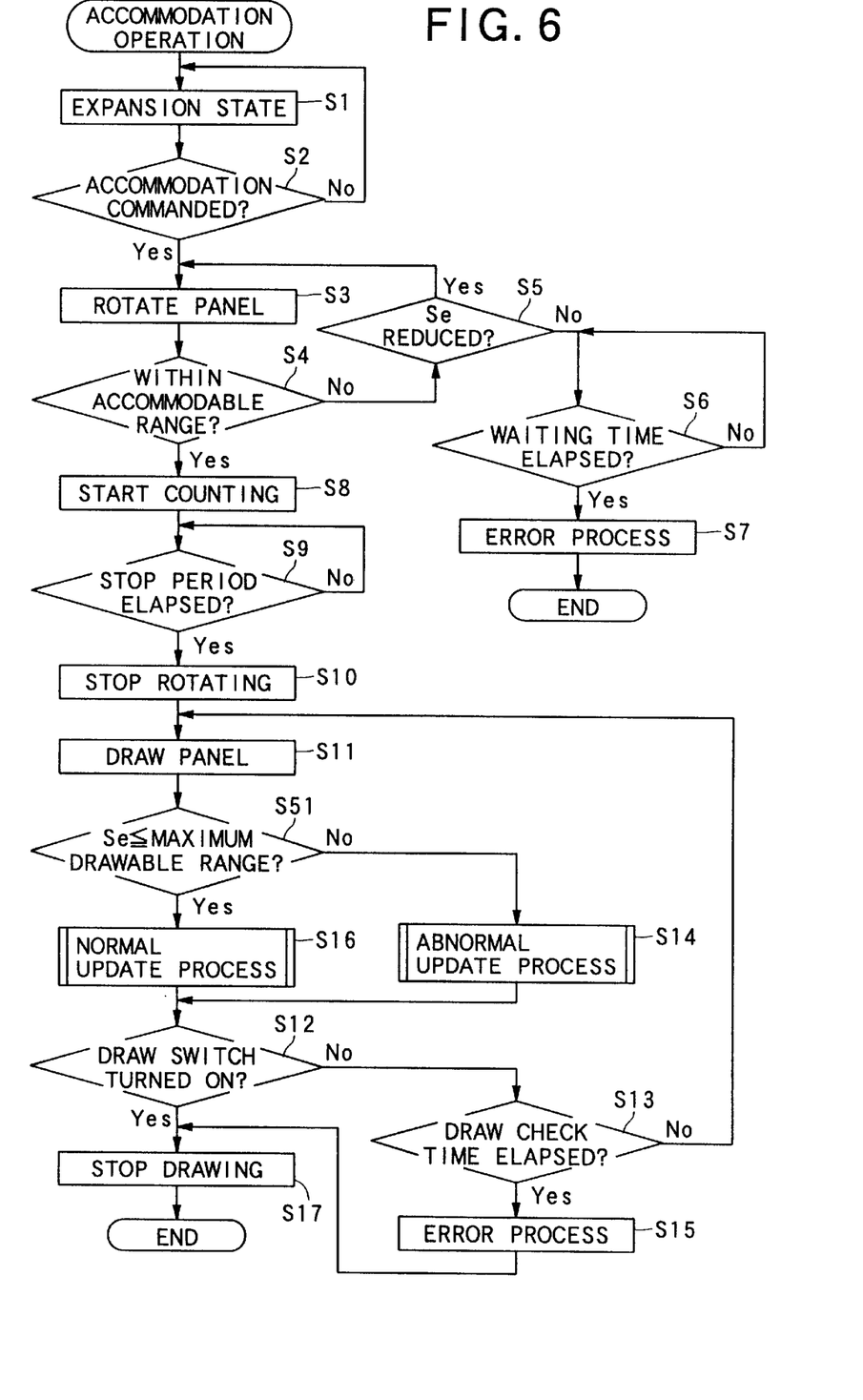
FIG. 6 is a flowchart showing an entire operation in an accommodation operation in a second embodiment.

A second embodiment of the present invention will be described below with reference to FIG. 6. FIG. 6 is a flowchart showing the entire operation of an accommodation operation according to the second embodiment.

In the first embodiment, the respective thresholds and the like are updated in accordance with the on or off state (refer to the step S12 of FIG. 3) of the draw switch 2, in the accommodation operation (refer to the steps S14 and S16 of FIG. 3). However, in the accommodation operation of the second embodiment, the respective update processes are done in accordance with only the voltage value of the position detection signal Se.

The configuration and the expansion operation in the display panel driving device of the second embodiment are similar to those of the display panel driving device S according to the first embodiment. Thus, the explanations of the detailed portions are omitted.

The operations at the steps S1 to S11 in the accommodation operation in the display panel driving device S of the first embodiment shown in FIG. 3 are firstly executed in the accommodation operation in the display panel driving device of the second embodiment shown in FIG. 6.

Then, when the draw of the display panel D is started, it is judged whether or not the voltage value of the position detection signal Se is equal to or less than a maximum value of the voltage value corresponding to a drawable range predetermined in accordance with a relation between the opening of the accommodation room portion K and a thickness of the display panel D (Step S51).

If the voltage value of the position detection signal Se is equal to or less than the maximum value (Step S51; YES), it is expected that the draw is normally carried out, and the above-mentioned normal update process is executed (Step S16). After that, the operations at the steps S12, S13, S15 and S17 in the accommodation operation in the display panel driving device S of the first embodiment shown in FIG. 3 are carried out.

On the other hand, if the voltage value of the position detection signal Se is equal to or greater than the maximum value (Step S51; NO), it is expected that the draw is impossible, and the above-mentioned abnormal update process is executed (Step S14). After that, similarly, the operational flow proceeds to the step S12 in the accommodation operation of the display panel driving device S of the first embodiment shown in FIG. 3.

Even the above-mentioned accommodation operation of the second embodiment can provide the effect similar to that of the accommodation operation of the first embodiment.

Here, in the above-mentioned respective embodiments, the case is described in which the present invention is applied to the configuration that the shaft J is mounted in the lower portion of the display panel D, and with this shaft J as the center, the display panel D is rotated so as to be thrown down, and after that, it is drawn and accommodated into the accommodation room portion K. However, in addition to this case, the present invention can be also applied to the configuration that, for example, the shaft J is mounted in the upper portion of the display panel D, and with this shaft J as the center, the display panel is rotated so as to be lifted up on this side, and after that, it is drawn and accommodated into the upper portion of the accommodation room.

In this case, it may be further designed such that the shaft J in the upper portion of the display panel D is dropped in conjunction with the rotation of the display panel D, and is then drawn and accommodated into the lower portion of the accommodation room.

Also, in the above-mentioned respective embodiments, the case is described in which the present invention is applied to the display panel driving device for driving the display panel D in the navigation apparatus. However, in addition to it, the present invention can be applied to, for example, an operation panel driver for accommodating or expanding an operation panel to control an audio visual apparatus for a vehicle.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 11-101646 filed on Apr. 8, 1999 including the specification, claims, drawings and summary is incorporated herein by reference in its entirety.

What is claimed is:

1. A rotation controlling apparatus for controlling a rotation of a panel member, which is rotated with a predetermined shaft as a center of the rotation, comprising:

a signal generating device for generating a position detection signal indicative of an angular position of said panel member around said shaft in response to a rotation of said panel member around said shaft; and a controller for controlling the rotation of said panel member in accordance with the position detection signal generated by said signal generating device, so as to stop the rotation of said panel member by using as a standard a generation timing of the position detection signal, which has a predetermined signal value based on a stop position signal value implying a value of the position detection signal indicative of a stop position at which the rotation of said panel member should be stopped, wherein said controller uses as the standard the generation timing of the position detection signal corresponding to an added signal value, in which a generation error signal value implying a value of the position detection signal set in advance to compensate a generation error, which may be included in the position detection signal, is added on the stop position signal value.

2. A rotation controlling apparatus according to claim 1, wherein said controller stops the rotation of said panel member, when a rotation time duration, which is set in advance as a time duration from the generation timing of the position detection signal corresponding to the added signal value until said panel member arrives in an allowable error range of the angular position which is set in advance in correspondence with the stop position, has elapsed from the generation timing of the position detection signal corresponding to the added signal value.

3. A rotation controlling apparatus for controlling a rotation of a panel member, which is rotated with a predetermined shaft as a center of the rotation, comprising:

a signal generating device for generating a position detection signal indicative of an angular position of said panel member around said shaft in response to a rotation of said panel member around said shaft; and a controller for controlling the rotation of said panel member in accordance with the position detection signal generated by said signal generating device, so as to stop the rotation of said panel member by using as a standard a generation timing of the position detection signal, which has a predetermined signal value based on a stop position signal value implying a value of the position detection signal indicative of a stop position at which the rotation of said panel member should be stopped, wherein (i) said signal generating device comprises:

an annular resistor which is rotated in conjunction with the rotation of said panel member and to both end terminals of which a voltage corresponding to a predetermined constant voltage value is applied; and a slide contact which contacts with said resistor while rotating, and (ii) said signal generating device outputs, as a value of the position detection signal, a voltage value of a voltage generated between said slide contact and one of the end terminals of said resistor in conjunction with the rotation of said panel member.

4. A rotation controlling apparatus for controlling a rotation of a panel member, which is rotated with a predetermined shaft as a center of the rotation, comprising:

a signal generating device for generating a position detection signal indicative of an angular position of said panel member around said shaft in response to a rotation of said panel member around said shaft; and a controller for controlling the rotation of said panel member in accordance with the position detection signal generated by said signal generating device, so as to stop the rotation of said panel member by using as a standard a generation timing of the position detection signal, which has a predetermined signal value based on a stop position signal value implying a value of the position detection signal indicative of a stop position at which the rotation of said panel member should be stopped, wherein the stop position is the angular position at which said panel member can be accommodated into an accommodation room portion by a straight movement of said shaft after said panel member stops.

5. A rotation controlling apparatus according to claim 4, wherein, when an accommodation of said panel member into the accommodation room portion is completed, said controller updates the stop position signal value to a value of the position detection signal, which is outputted at a timing when the accommodation is completed.

6. A rotation controlling apparatus according to claim 4, wherein, when an accommodation of said panel member into the accommodation room portion is not possible, said controller updates the stop position signal value to an initial value, which is set in advance as a value of the position detection signal indicative of the stop position at which said panel member can be accommodated into the accommodation room portion.

7. A rotation controlling apparatus according to claim 4, wherein said panel member comprises one of a display panel for displaying information related to a vehicle navigation process to guide a vehicle and an operation panel for performing an operation to control an audio visual apparatus of vehicle installation type, and the stop position comprises one of the angular position where the information is displayed by said display panel and the angular position where the operation is performed by said operation panel.

8. An electric apparatus comprising
(i) a panel member, which is rotated with a predetermined shaft as a center of the rotation,
(ii) an accommodation room portion into which said panel member can be accommodated,
(iii) a rotation controlling apparatus for controlling a rotation of the panel member comprising:
  a signal generating device for generating a position detection signal indicative of an angular position of said panel member around said shaft in response to a rotation of said panel member around said shaft; and
  a controller for controlling the rotation of said panel member in accordance with the position detection signal generated by said signal generating device, so as to stop the rotation of said panel member by using as a standard a generation timing of the position detection signal, which has a predetermined signal value based on a stop position signal value implying a value of the position detection signal indicative of a stop position at which the rotation of said panel member should be stopped,
  the stop position being the angular position at which said panel member can be accommodated into the accommodation room portion by a straight movement of said shaft after said panel member stops, and
(iv) an accommodating device for accommodating said panel member and said rotation controlling apparatus in one body into said accommodation room portion,
  said accommodation room portion being installed in a dash board within a compartment of a vehicle.

9. An electric apparatus according to claim 8, wherein said accommodating device accommodates said panel member and said rotation controlling apparatus in one body into said accommodation room portion, by straightly moving said shaft after the rotation of said panel member is stopped.

10. A rotation controlling apparatus for controlling a rotation of a panel member, which is rotated with a predetermined shaft as a center of the rotation, comprising:

a signal generating device for generating a position detection signal indicative of an angular position of said panel member around said shaft in response to a rotation of said panel member around said shaft; and a controller for controlling the rotation of said panel member in accordance with the position detection signal generated by said signal generating device, so as to stop the rotation of said panel member by using, as a standard, a generation timing of the position detection signal, which has an added signal value based on a stop position signal value implying a value of the position detection signal indicative of a stop position at which the rotation of said panel member should be stopped, wherein the added signal value, in which a generation error signal value implying a value of the position detection signal set in advance to compensate a generation error, which may be included in the position detection signal, is added to the stop position signal value.

11. A rotation controlling apparatus according to claim 10, wherein said controller stops the rotation of said panel member, when a rotation time duration, which is set in advance as a time duration from the generation timing of the position detection signal corresponding to the added signal value until said panel member arrives in an allowable error range of the angular position which is set in advance in correspondence with the stop position, has elapsed from the generation timing of the position detection signal corresponding to the added signal value.

12. A rotation controlling apparatus according to claim 4, wherein, when an accommodation of said panel member into the accommodation room portion is completed, said controller updates the stop position signal value to a value of the position detection signal, which is outputted at a timing when the rotation is completed.

* * * * *